United States Patent [19]
Einhorn et al.

[11] Patent Number: 5,136,631
[45] Date of Patent: Aug. 4, 1992

[54] METHOD AND APPARATUS FOR PROGRAMMING A VOICE SERVICES SYSTEM

[75] Inventors: Kenneth H. J. Einhorn, Austin; Jay D. Stewart, Cedar Park, both of Tex.

[73] Assignee: Texas Instruments Incorporated, Dallas, Tex.

[21] Appl. No.: 569,676

[22] Filed: Aug. 20, 1990

[51] Int. Cl.[5] .................... H04M 1/00; H04M 3/42
[52] U.S. Cl. .................................. 379/67; 379/88; 379/201
[58] Field of Search ................. 379/88, 89, 201, 67

[56] References Cited

U.S. PATENT DOCUMENTS

| | | | |
|---|---|---|---|
| 4,716,583 | 12/1987 | Groner et al. | 379/88 |
| 4,747,127 | 5/1988 | Hansen et al. | 379/94 |
| 4,755,932 | 7/1988 | Diedrich | 364/200 |
| 4,782,517 | 11/1988 | Bernardis et al. | 379/201 |
| 4,991,199 | 2/1991 | Pareleh et al. | 379/97 |

*Primary Examiner*—Thomas W. Brown
*Attorney, Agent, or Firm*—L. Joy Griebenow; William E. Hiller; Richard L. Donaldson

[57] ABSTRACT

A voice services system (10) uses a pseudo-code stored in a memory associated with a first processing unit (20) to control presentation of the voice services. Under control of the first pseudo-code, a second pseudo-code may be transferred from a second memory (28) to memory associated with a second processing unit to perform telephony control.

22 Claims, 2 Drawing Sheets

METHOD AND APPARATUS FOR PROGRAMMING A VOICE SERVICES SYSTEM

RELATED APPLICATIONS

This patent application is related to U.S. patent application Ser. No. 569,677, entitled "Voice Services System," by Einhorn et al., filed Aug. 20, 1990, and U.S. patent application Ser. No. 570,171, entitled "Digital Signal Processing Control Method and Apparatus", by Einhorn et al., filed Aug. 20,1990.

TECHNICAL FIELD OF THE DISCLOSURE

This invention relates in general to electronic circuits, and particularly to a voice services system.

BACKGROUND OF THE DISCLOSURE

Voice communications have become an important factor in increasing the productivity of modern day business concerns. Newly developed voice communications systems, including voice messaging and call delivery systems, have resulted in the efficient transfer of information and reduced needless paperwork. These systems have expanded greatly in scope, providing more services and increasing number of users. As the number of services and users has increased, the complexity of providing these services in real-time has similarly increased.

A voice services system must be able to perform certain functions. First, the voice services system must interact with the telephone system, being able to produce the proper signals to interface with the telecommunications network to which it is attached. Second, it must maintain many databases related to its users and services. For example, billing information, user profiles and voice messages must all be maintained. Third, an interface to the user must be provided.

As voice communications has developed, the need to update and enhance features has similarly increased. Present day voice messaging systems are programmed using binary files (object code) which depend upon the specific hardware used in the system. This architecture provides two problems. First, updating and enhancing the code is a tedious process requiring many man-hours. Second, the code is not portable and therefore, as the hardware is modified or enhanced, the code must be revised or rewritten.

Therefore, a need has arisen in the industry for a voice services system which uses easily modifiable, portable code.

SUMMARY OF THE DISCLOSURE

In accordance with the present invention, a voice services system is provided which substantially eliminates the problems or prevents the disadvantage and problems associated with prior voice service devices.

The voice services system of the present invention uses a first pseudo-code in a first memory to control a first processing unit, the first pseudo-code controlling the presentation of the voice services. A second pseudo-code is stored in a second memory associated with the first processing unit. Responsive to the first pseudo-code, second pseudo-code is transferred from the second memory to a third memory associated with a second processing unit. The second pseudo-code is operable to control the second processing unit to perform telephony control.

Because the present invention uses easily modifiable pseudo-code to perform the programming of the voice services system, changes in the features of the system may be easily accommodated. Second, by providing a suitable interpreter, the pseudo-code is transportable between different hardware designs.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DISCLOSURE

The preferred embodiment of the present invention is best understood by referring to FIGS. 1-6 of the drawings, like numerals being used for like and corresponding parts of the various drawings.

Figure 1:
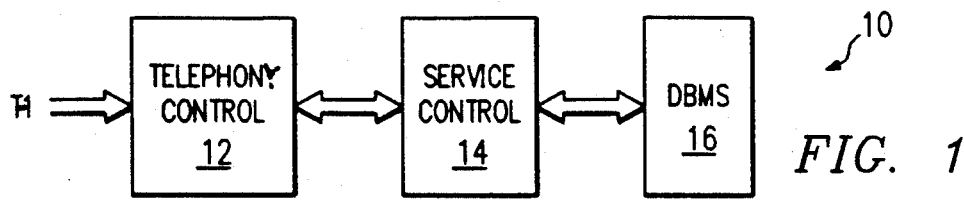
FIG. 1 illustrates a block diagram of a voice services system employing the present invention.

FIG. 1 illustrates a block diagram of the voice services system of the present invention.

The voice services system 10 comprises a telephony control section 12 connected to a T-1 line and a service control section 14 connected to the telephony control section 12 and a database management system (DBMS) 16. The voice services system may provide any number of services, such as voice messaging, call delivery, direct dialling and so on. It may include other features related to these services such as voice recognition and speaker verification.

In operation, the DBMS 16 is a mainframe computer which maintains customer records, billing information, voice data files, and other data related to the offered voice services requiring a larger database system such as voice templates for each customer used in speaker verification and speech data used in speaker independent speech recognition. The service control section 14 provides the interface between the database management system 16 and the users of the telecommunications system. For example, the service control section 14 oversees the voice messaging system. This would entail retrieving messages from the DBMS 16, prompting the caller for instructions, responding in accordance with the caller's commands and so on. The telephony control section 12 interfaces with the T-1 line, performing the actual sending and receiving of voice data to the caller and managing the telecommunications protocols.

Figure 2:
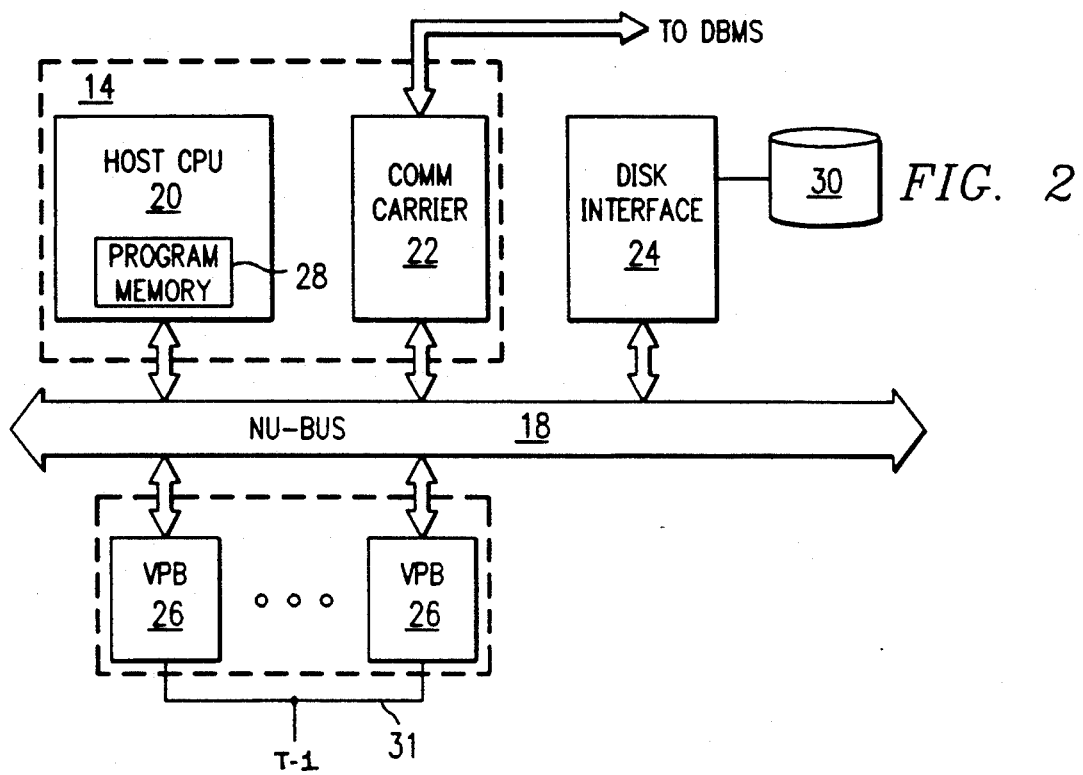
FIG. 2 illustrates a more detailed block diagram of the voice services system of FIG. 1.

FIG. 2 illustrates a more detailed block diagram of the preferred embodiment of the voice services system 10 of FIG. 1. A bus 18, preferably conforming to the NU-BUS standard, is coupled to a CPU 20, a communications carrier 22, a disk interface 24, and a plurality of voice processing boards (VPB's) 26. The CPU 20 is coupled to a program memory 28. The disk interface is coupled to a hard disk 30, or other mass storage device. The VPBs 26 are also connected to the T-1 line via a T-1 bus 31. The communications carrier 22 is connected to the DBMS 16.

The VPBs 26 comprise the telephony control section 12. Each VPB 26 comprises a plurality of digital signal processors (DSPs), as illustrated in greater detail in connection with FIG. 3. Each VPB board is preferably a multi-tasking system, such that each VPB 26 handles multiple channels on the T-1 line.

The CPU 20 preferably comprises a multiprocessor, for example, the Motorola 68030. The program memory 28 stores program routines and data parameters which are transferred to the VPBs 26 under control of the CPU 20. The CPU 20 also contains a local program memory (not shown) which provides instructions for the microprocessor.

The communications carrier 22 provides the communications functions to transfer information between the bus 18 to the DBMS 16. The disk interface 24 provides an interface between the bus 18 and a mass storage device, such as hard disk 30, primarily used for storing temporary data associated with the voice messaging services.

In operation, the CPU 20 transfers program routines and data parameters from the program memory 28 to the VPBs 26. The VPBs 26 execute the program routines downloaded by the CPU 20. When execution of the program routines is complete, the CPU 20 is notified via bus 18, and the CPU may download another program routine.

Each program routine may be thought of as a portion of an application program. By executing only a portion of an application program in the VPB 26, several advantages are evident. First, the program routines allow an execution of an application program which has memory requirements much greater than the local memories contained in the VPBs 26. Second, an application program may be dynamically adjusted during runtime by modifying the order of program routines transferred to the VPBs 26. Third, additional services and features may be added to the system 10 without interrupting its on-going operations.

Figure 3:
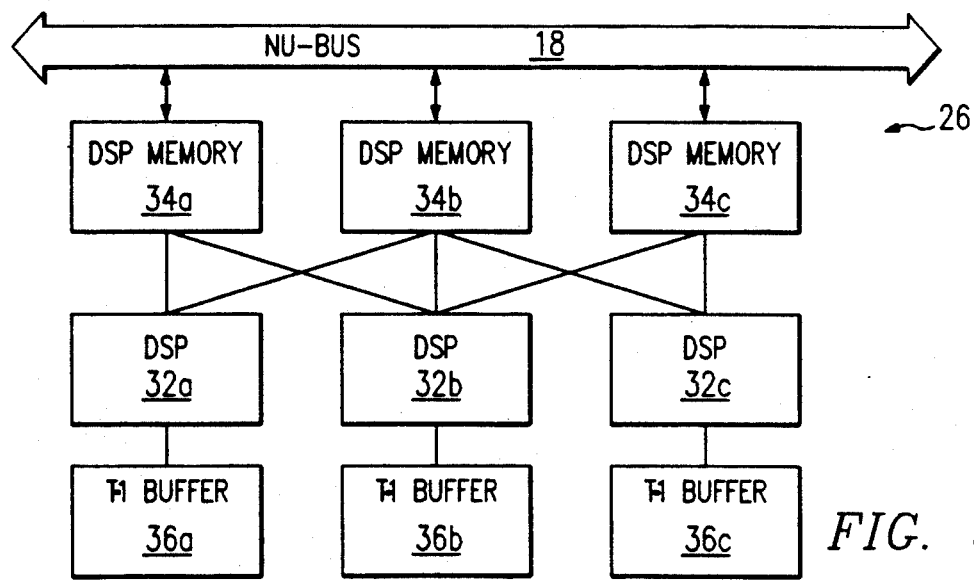
FIG. 3 illustrates a block diagram of a voice processing board of the present invention.

FIG. 3 illustrates a block diagram of a VPB 26. Each VPB 26 comprises a plurality of DSPs 32 (shown individually as DSP 32a-c). Each DSP 32a has a respective DSP memory 34a-c and a respective T-1 buffer 36a-c. The DSP memories 34a-c are cross-coupled between the DSPs 32a-c such that communication between the DSPs is possible. Circuitry for interfacing with the NU-BUS (not shown) may comprise a Texas Instruments TMS 320C25 integrated circuit.

In the preferred embodiment, the DSPs 32 comprise Texas Instruments TMS 320C30 digital signal processors. Each DSP memory 34 comprises a one megabyte memory arranged as 256 k×4 bytes (for a 32-bit word). The T-1 buffer comprises a Mitel MT8920 ST-bus parallel access circuit. The T-1 buffer translates waveforms generated by the DSPs to provide suitable signals to place on a T-1 line. Additional T-1 chips, such as the Mitel MT8980 and MT89760 are necessary to communicate with the T-1 line.

In operation, one DSP 32 is responsible for running the program routines downloaded by the CPU 26. The other DSPs are dedicated to particular functions. For example, one DSP may be dedicated to the speaker independent continuous digit recognition wherein a caller may speak the digits into the telephone receiver rather than enter digits using a keypad. Another dedicated function would be speaker verification wherein the caller is identified and verified through use of a spoken identification code. In speaker verification, the identification code is determined using the speaker independent continuous digit recognition, and a voice template is retrieved from the DBMS 16 corresponding to that identification code. The voice template is then compared to the actual spoken code to determine whether the caller is an authorized user.

While the preferred embodiment shows three DSPs and associated memories and T-1 buffers, more or less could be used depending upon the nature of the device in which the DSPs 32 are utilized.

Figure 4:
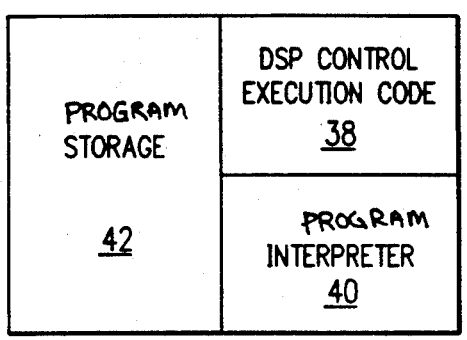
FIG. 4 illustrates the partitioning of a DSP memory.

FIG. 4 illustrates how the DSP memory 34 is used in connection with the DSP which is responsible for executing the program routines transferred by the CPU. The DSP memory 34 may be thought of as having three areas, a DSP control execution code section 38, a program interpreter section 40 and a program storage section 42. The program storage section 42 stores the program routines and parameter data transferred from the CPU 20 to the VPB 26. The program routines are preferably in a pseudo-code form. The program interpreter section 40 contains a code which interprets the pseudo-coded program routines in the program storage section 42. The DSP control execution code section 38 stores code not changed by the CPU 20. This code supports requests from the downloaded software, multitasking and T-1 and NU-BUS transfer protocols. For example, a pseudo-coded program routine downloaded into the program storage section 42 may contain a function "gen-tone (5)" which indicates a DTMF signal corresponding to keypad digit 5 is desired. The program interpreter interprets the instruction and accesses the appropriate DSP control code to implement the appropriate DTMF signal.

The actual program language interpreted by the program interpreter will vary depending on the application. For the application of a telecommunication system described hereinabove, the following commands are supported:

ARITHMETIC

Arithmetic operations: +, −, *, /, mod, = and '−' for unary minus.

Boolean operations: and, or, xor, not

COMPARISONS

Comparisons are used in the "if-condition-then-statement" construct to evaluate to TRUE or FALSE. Both string and integer variables can be compared.

Arithmetic comparisons: =, !=, <, >, ≦, ≧

Boolean comparisons: and, or, xor, not, eq.

FUNCTIONS

ATOI (strexpr): converts a string of digits to its numerical representation.

CHR (intexpr): returns the ASCII character which corresponds to the number given.

ITOA (intexpr): converts a number to the string which represents it.

LEN (strexpr): returns the length of the input string.

VAL (strexpr): returns the ASCII value of the first character in the string.

PROCEDURES

The following procedures, mostly relating to telecommunications operations, are supported.

| PROCEDURE | EXPLANATION |
| --- | --- |
| Answer_phone | Prepares the VPB to receive an incoming call and activates the on-hook detection routine once a call has been received. |
| Connect_lines | Connects an incoming and outgoing T-1 channel so the callers on the end of the line can talk to each other. |
| Gen_tone | Generates phone signals on the designated phone line. The signals may be DTMF tones, TOLLMF tones, or special tones such as beeps, warbles, bonds, etc. |
| Monitor | Listen to a phone channel and determine what is heard. |
| Play | Play the contents of a voice file. |
| Recognize | Speaker independent or speaker dependent (or both at the same time) recognition. Template update done on speaker dependent phrases. |
| Record | Record the sounds on the specified T-1 line into a digitized data file. |
| Recv_tone | Activates the task that detects tones on a phone channel. |
| Send_off_hook | Send an off-hook signal on the designated channel. This will accept an incoming call from the network switch. |
| Send_on_hook | This will terminate the use of a T-1 channel. It generates an on-hook signal to the network switch and closes and de-allocates the channel from the VPB. |
| Seize | Prepares the VPB to use an output T-1 channel. |
| Sicdr | Performs speaker independent continuous digit recognition. |
| Verify | The subscriber's voice (recorded or live) is verified against the stored template from the subscriber's profile. If the voice verifies successfully, the template will be updated. |
| Wait_off_hook | Waits for an off-hook to occur on the outgoing T-1 channel. The off-hook indicates that the network switch is prepared to receive the card number and the card ID for an outgoing call. Once the off-hook has been detected, the on-hook detection routine will be activated. |

Figure 5:
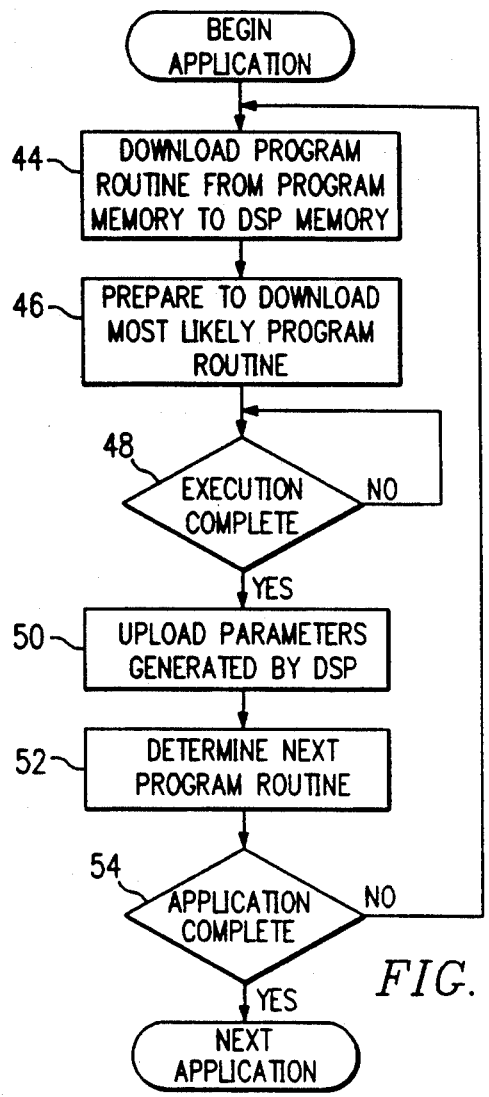
FIG. 5 illustrates a flow chart describing downloading of program routines to digital signal processors.

FIG. 5 illustrates a flow chart of the downloading process. In block 44, a program routine is downloaded from the program memory 28 to the DSP memory 34 corresponding to the desired DSP 32a-c. After downloading the first program routine, the CPU 20 may determine the most likely program routine to be downloaded next in sequence (block 46). The CPU then waits for the DSP 32 to complete execution of the program routine (decision block 48). Once the execution of the program routine is complete, the CPU uploads parameters generated by DSP (if any) during execution of the program routine (block 50). Based on the uploaded parameters, the CPU 20 determines the next program routine to be executed by the DSP (block 52). If the application program has not been completed (Block 54), the next program routine is downloaded (block 44).

Figure 6:
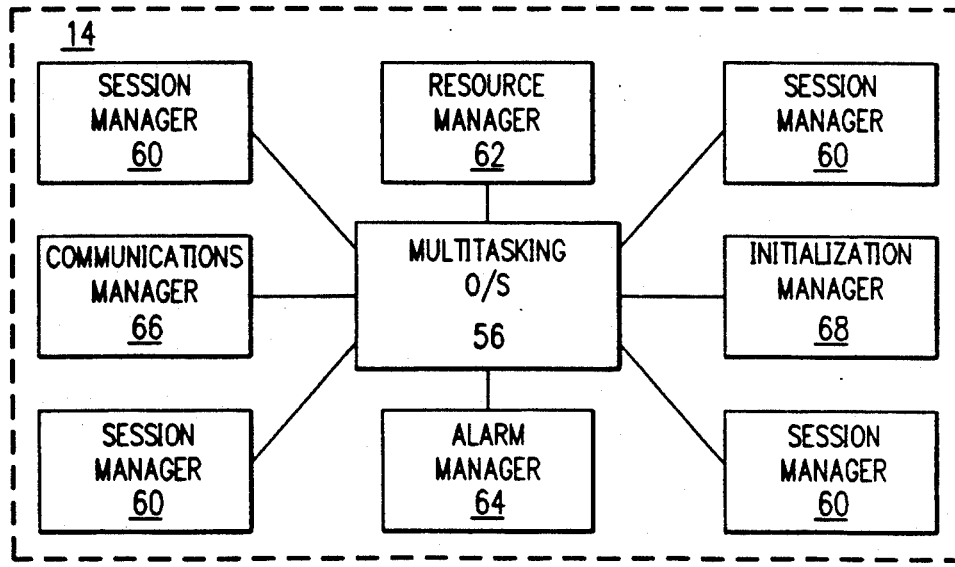
FIG. 6 illustrates a functional block diagram of a service control section of the voice services system.

FIG. 6 shows a functional block diagram of the service control section 14. The service control section 14 provides a plurality of services managed by a multitasking operating system 56 executed by the CPU 20 which allows it to simultaneously execute a plurality of independent programs. Similar to program execution in the VPBs 26, the programs executed by the CPU 20 are in a pseudo-coded format and are executed in conjunction with a interpreter. This aspect of the invention allows the programs to be quickly and easily changed, and also allows portable programs to be developed.

For each incoming call, the CPU 20 executes a session manager program 60. Although four such session manager programs are shown, the number of session manager programs running simultaneously will depend upon the number of incoming calls to the system 10. The session manager program 60 provides the interaction with the caller. For example, upon receipt of the call, the session manager 60 will ask for the user's identification and will verify the supplied identification, preferably using speaker verification. To do so, the session manager 60 must retrieve data from the DBMS 16 for prompting the user for his or her identification, transfer the prompt data to the VPB 26 along with a program which instructs the VPB 26 to relay the prompt over the T-1 line. After the prompt is issued, the session manager 60 must provide the program to the VPB 26 which interprets the user's response. This may involve several program routines for recognizing the caller's speech and for verifying the speech against a voice template for the authorized user which is stored in the DBMS 16.

The session manager code is written in a pseudo-coded format which is interpreted by the CPU 20. Thus, the services offered by the voice services system 10 can be changed easily by modifying the pseudo-code. In the preferred embodiment, the session manager 60 comprises a plurality of smaller "presentation" programs. The variables associated with the session manager are preserved as presentation programs are shuffled in.

The service control section 14 also provides a resource processor 62 which resolves contention between the session managers 60. Since the session managers 60 run independently from one another, the resource processor 62 is necessary to prioritize the use of the VPBs 26 and the DBMS 16. The resource manager 62 is also implemented in the service control section 14 by the CPU 20 a multitasked program.

An alarm manager 64 is provided in the service control section 14, multitasked by the CPU 20. The alarm system 64 detects error states in the voice services system 10 and with the T-1 facilities and reports the errors to the DBMS 16, and to the system operator, if necessary.

A communication manager 66 oversees the communications between the service control section 14 and the DBMS 24 in conjunction with the communications carrier 22.

An initialization manager 68 starts the alarm manager 64 and communications manager 66 at start up of the voice services system 10. Furthermore, the initialization manager 68 initializes each VPB 26 at start up. For each incoming call, the initialization manager initiates a session manager 60.

Hence, the service control section 14 is constantly transferring data to and from the DBMS 16 and the telephony control section 12. In the prior art, the control provided by the service control section 14 would have been provided by the DBMS 16. Consequently, the resources of the DBMS would be severely strained. Further, the present invention allows the features of the voice services system to be updated without affecting operation of the DBMS 16.

The present invention provides several advantages over the prior art. The application program may be changed dynamically during runtime by the order of transfer of program routines from the program memory 28 to the VPBs 26. Since the CPU 20 transfers program routines and data into an area of the DSP memory 34 which is not executed by the DSP 32, but rather is executed through the DSP's execution of the script interpreter and the control code, an idle/reset routine is unnecessary, which circumvents the problems associated with prior art devices. Further, since pseudo-code is transferred, the code may be transportable to other platforms using different hardware by preparing a suitable script interpreter and control code for the digital signal processor involved.

Although the present invention has been described in detail, it should be understood that various changes, substitutions and alterations can be made herein without departing from the spirit and scope of the invention as defined by the appended claims.

What is claimed is:

1. A method of programming a voice services system, comprising the steps of:
   providing a first pseudo-code in a first memory to control a first processing unit, said first pseudo-code controlling the presentation of the voice services;
   storing second pseudo-code in a second memory associated with the first processing unit; and
   transferring the second pseudo-code from said second memory to a third memory associated with a second processing unit responsive to said first pseudo-code, said second pseudo-code controlling the second processing unit to perform telephony control.

2. The method of claim 1 wherein said step of providing the first pseudo-code comprises the step of providing a plurality of pseudo-code subroutines.

3. The method of claim 2 and further comprising the step of storing data in said first memory which is retained as said subroutines are stored in said first memory.

4. The method of claim 1 wherein said step of transferring second pseudo-code comprises the step of transferring one or more of a plurality of pseudo-code subroutines stored in said second memory to said third memory responsive to said first pseudo-code.

5. The method of claim 4 and further comprising the step of storing data in said third memory in such a manner that said data is not affected by the transfer of said pseudo-code subroutines from said second memory to said third memory.

6. The method of claim 1 and further comprising the step of providing an interpreter in said first memory to execute said first pseudo-code.

7. The method of claim 6 and further comprising the step of providing an interpreter in said third memory to execute said second pseudo-code.

8. The method of claim 1 wherein said first pseudo-code comprises one of a plurality of pseudo-code programs in said first memory, and further comprising the step of multitasking said pseudo-code programs in said first memory.

9. The method of claim 1 wherein said first processing unit comprises a microprocessor.

10. The method of claim 1 wherein said second processing unit comprises a digital signal processor.

11. Apparatus for performing voice services, comprising:
    a first memory operable to store first pseudo-code to control a first processing unit, said first pseudo-code controlling the presentation of the voice services;
    a second memory for storing second pseudo-code, said second memory associated with the first processing unit; and
    a second processing unit having an associated third memory, said first processing unit operable to transfer the second pseudo-code from said second memory to said third memory associated with said second processing unit responsive to said first pseudo-code, said second pseudo-code controlling said second processing unit to perform telephony control.

12. The voice services apparatus of claim 11 wherein said first pseudo-code comprises a plurality of pseudo-code subroutines.

13. The voice services apparatus of claim 12 wherein said first memory is operable to store data which is retained as said subroutines are stored in said first memory.

14. The voice services apparatus of claim 11 wherein said second pseudo-code comprises a plurality of pseudo-code subroutines and said first processing unit is operable to transfer one or more of the plurality of pseudo-code subroutines stored in said second memory to said third memory responsive to said first pseudo-code.

15. The voice services apparatus of claim 14 wherein said third memory is operable to store data which is retained as said subroutines are stored in said third memory.

16. The voice services apparatus of claim 11 and wherein said first memory further stores an interpreter to execute said first pseudo-code.

17. The voice services apparatus of claim 16 and wherein said third memory further stores an interpreter in said third memory to execute said second pseudo-code.

18. The voice services apparatus of claim 11 wherein said first pseudo-code comprises one of a plurality of pseudo-code programs in said first memory, and wherein said first memory further stores a multitasking operating system program to allow said first processing unit to multitask said pseudo-code programs in said first memory.

19. The voice services apparatus of claim 11 wherein said first processing unit comprises a microprocessor.

20. The voice services apparatus of claim 11 wherein said second processing unit comprises a digital signal processor.

21. The method of claim 2, wherein said plurality of pseudo-code subroutines are independently stored in said first memory.

22. The method of claim 12, wherein said plurality of pseudo-code subroutines are independently stored in said first memory.

* * * * *